Patented Jan. 14, 1936

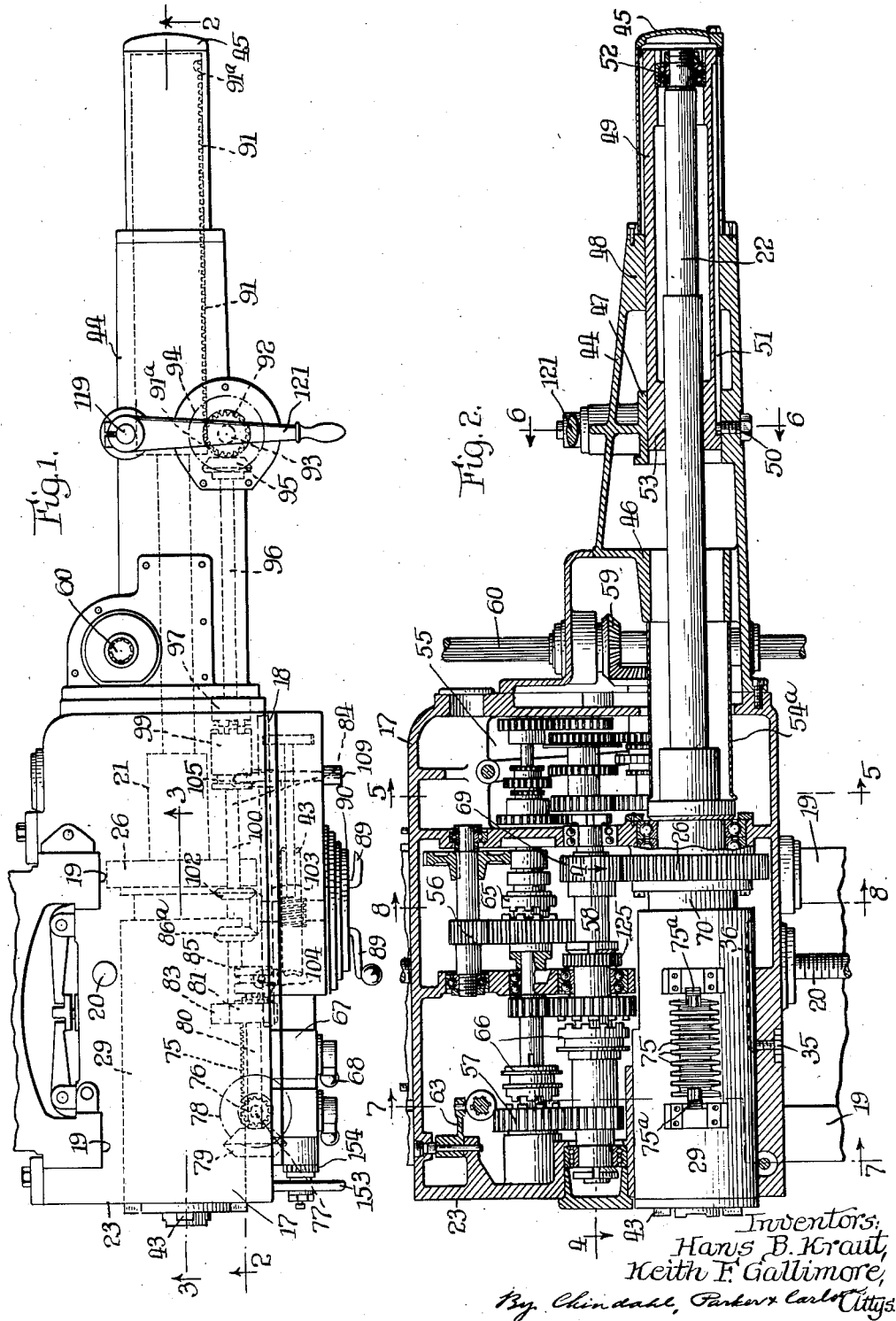

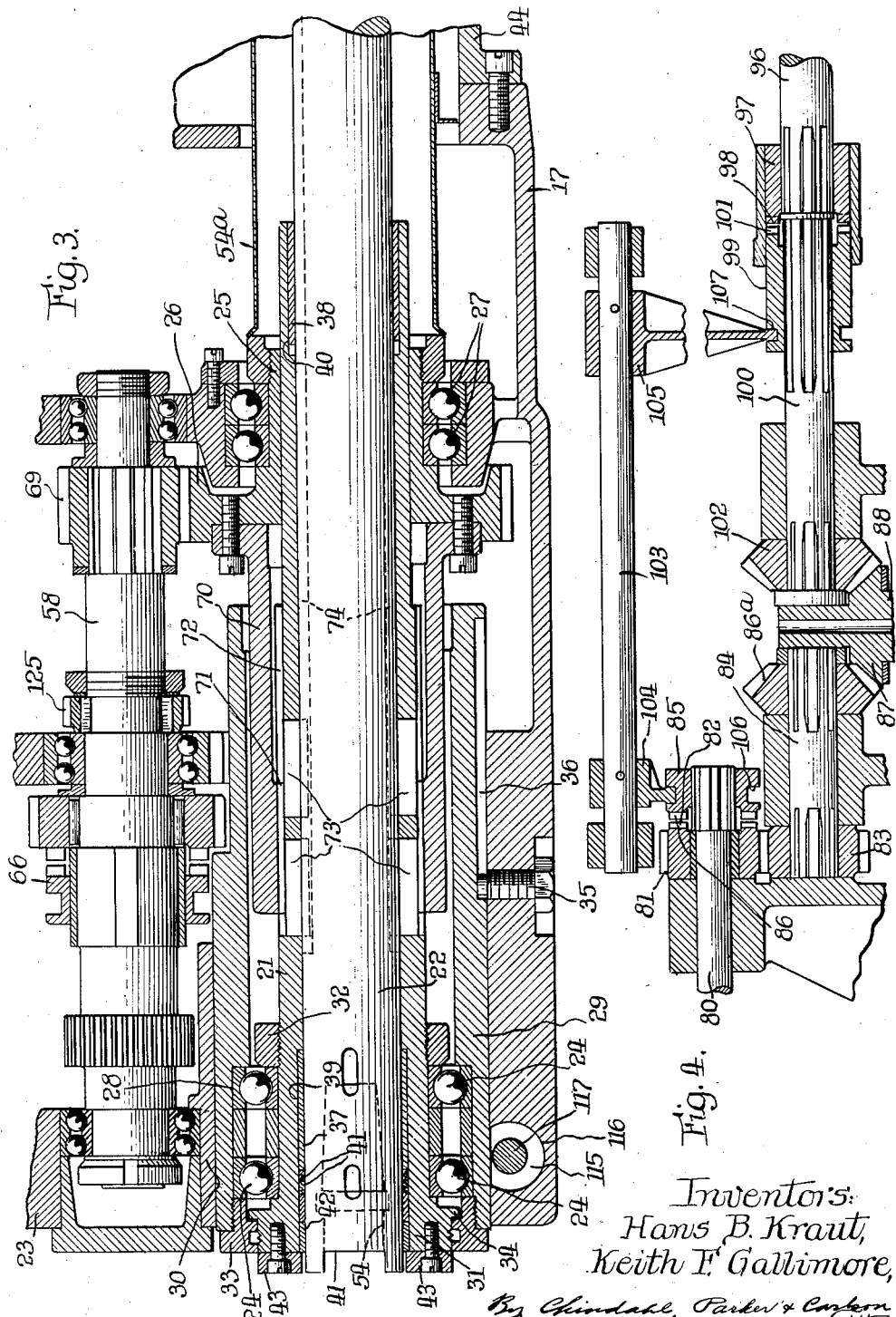

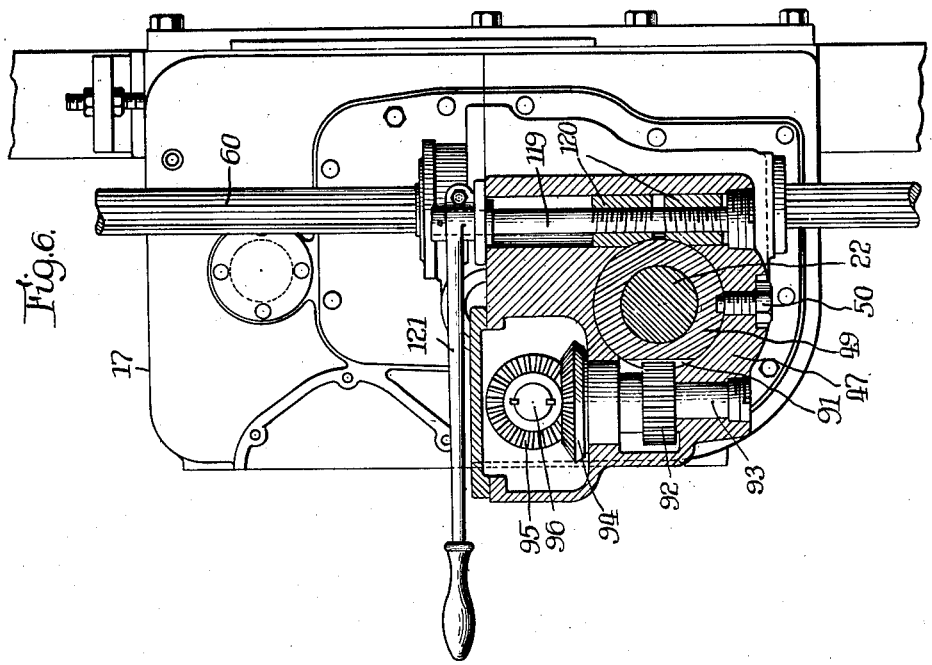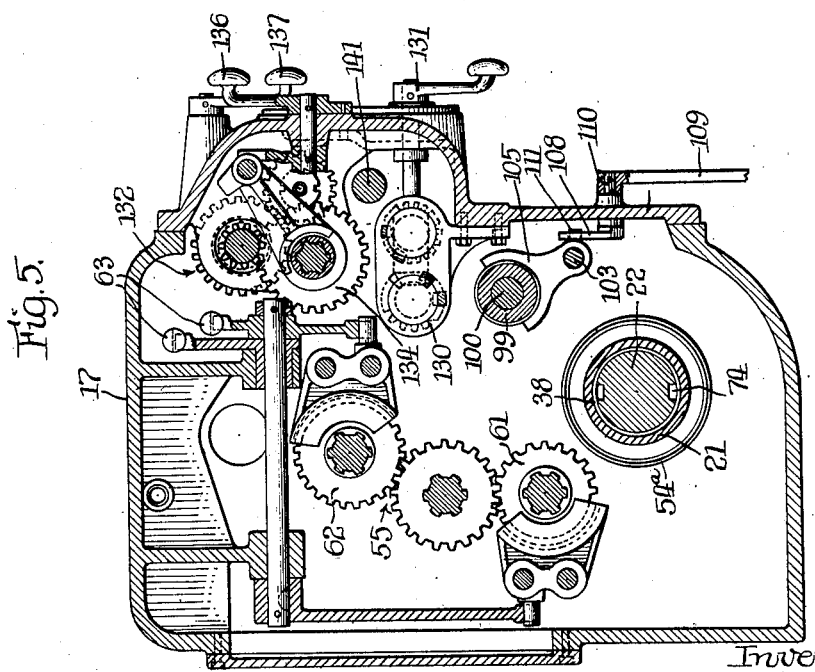

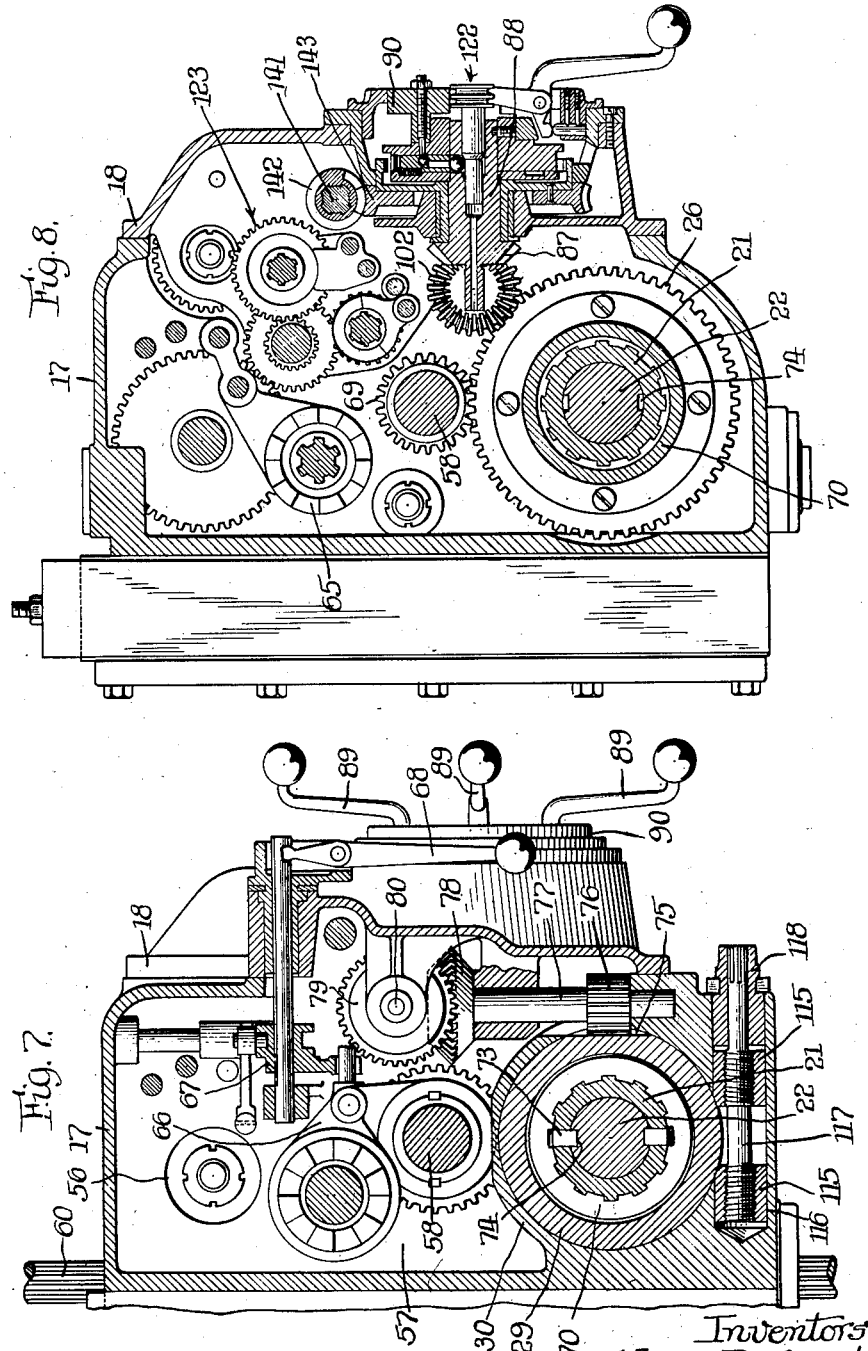

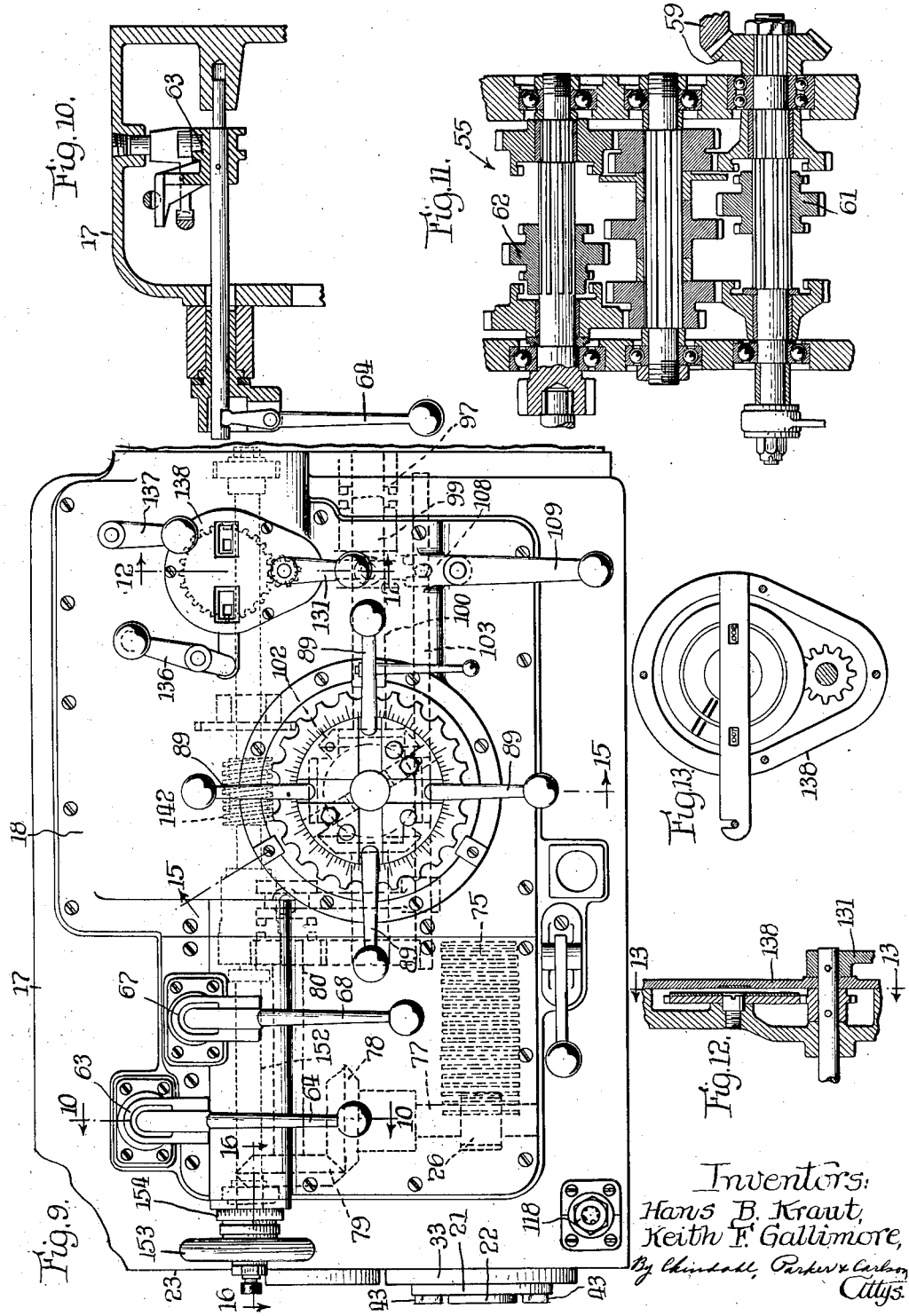

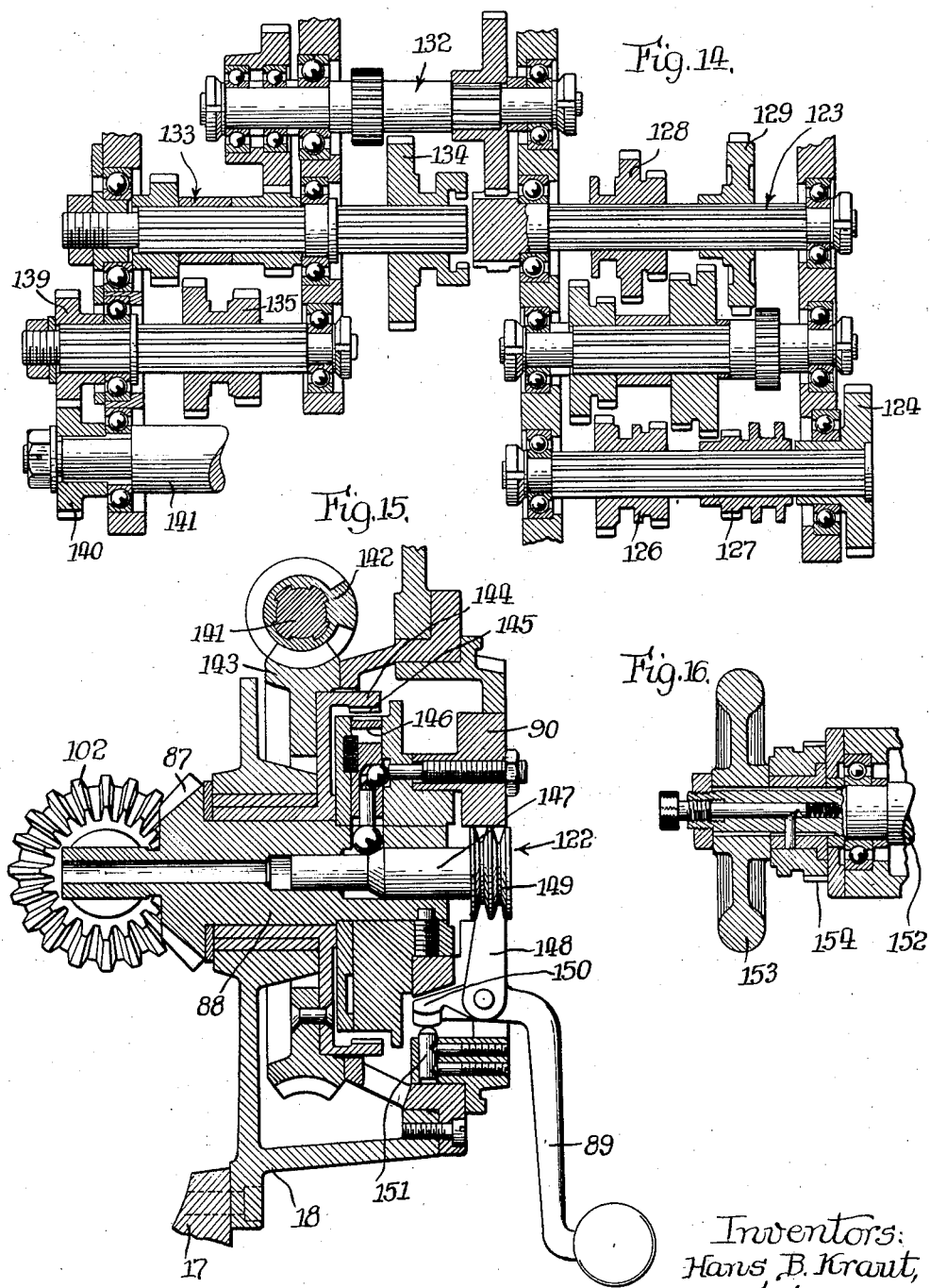

2,027,385

UNITED STATES PATENT OFFICE 2,027,385

HEADSTOCK FOR MACHINE TOOLS

Hans B. Kraut and Keith F. Gallimore, Fond du Lac, Wis., assignors to Gidding & Lewis Machine Tool Co., Fond du Lac, Wis., a corporation of Wisconsin Application June 28, 1934, Serial No. 732,792

21 Claims. (Cl. 29—26)

The present invention relates to a new and improved headstock for machine tools, and has particular reference to a spindle headstock with self contained spindle drive means adapted for machines of the type commonly known as horizontal boring, drilling and milling machines.

A general object of the invention is to provide a novel spindle headstock which is especially adapted for the efficient performance of various metal removing operations over a wide range of working conditions.

A further object resides in the provision of a new and improved headstock having two concentric rotary spindles of which the outer spindle constitutes a supporting sleeve for the inner spindle, and which are adapted selectively for independent axial movement. In similar headstocks as heretofore constructed, a boring spindle is slidably mounted in a rotatable sleeve which is held against endwise movement. Suitable cutters can be mounted on either the spindle or the sleeve, but only the cutter on the spindle can be adjusted into different axial positions, as desired for example when stepped surfaces are to be milled. However, for certain operations, and particularly for heavy duty facing and milling, in which the spindle would have to be projected axially, the spindle would be subject to objectionable side flexure, and hence cannot be used satisfactorily. Hence, such prior construction is subject to material limitations in use. The present construction overcomes these disadvantages in that the outer spindle, which is sufficiently sturdy and large in diameter to avoid appreciable flexure, and which by reason of its concentric relation to the inner spindle requires comparatively little additional space, can be axially projected to carry out such operations more satisfactorily and efficiently than heretofore possible.

Another object resides in the provision of novel means whereby either spindle may be fed manually or by power.

Further objects and advantages will become apparent as the description proceeds.

In the accompanying drawings, Figure 1 is a plan view of a headstock embodying the features of our invention.

Fig. 2 is a longitudinal vertical sectional view through the headstock taken substantially along line 2—2 of Fig. 1.

Fig. 3 is a fragmentary axial vertical sectional view through the spindles taken substantially along line 3—3 of Fig. 1.

Fig. 4 is a fragmentary horizontal sectional view of the feed drive taken substantially along line 4—4 of Fig. 2, and with the clutch shifting mechanism shown in plan development.

Figs. 5 to 8 are transverse vertical sectional views taken respectively along lines 5—5 to 8—8 of Fig. 2.

Fig 9 is a fragmentary front elevational view of the headstock.

Fig. 10 is a fragmentary transverse sectional view taken substantially along line 10—10 of Fig. 9.

Fig. 11 is a development of a nine-speed gearing in the spindle rotative drive.

Fig. 12 is a detail sectional view taken along line 12—12 of Fig. 9.

Fig. 13 is a sectional view taken along line 13—13 of Fig. 12.

Fig. 14 is a development of a change-speed and reverse gearing in the spindle feed drive mounted on the inside of the front wall of the headstock.

Fig. 15 is an enlarged sectional view taken substantially along line 15—15 of Fig. 9.

Fig. 16 is a detail sectional view taken substantially along line 16—16 of Fig. 9.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the invention in its preferred form is shown as embodied in a spindle headstock which may be employed in various types of machine tools, and which is adapted particularly for use on horizontal boring, drilling and milling machines of the planer and floor types. The headstock comprises a closed hollow casing 17 having a removable front cover plate 18, and mounted on column-ways 19 for vertical adjustment by means of a feed screw 20.

Mounted in the casing 17 are two concentric spindles 21 and 22 which are adapted for rotation and for independent axial adjustment or feed, and which are accessible at one end wall 23 of the casing for the attachment of various tools or fixtures (not shown). In the present instance, the outer spindle 21 is provided in the form of an elongated sleeve for slidably supporting the inner spindle 22.

The outer spindle 21, which may be designated an a milling spindle, is journaled at its operative end in anti-friction bearings 24, and is snugly and slidably supported at its other end in an elongated hub 25 of a gear 26 journaled in anti-friction bearings 27 within the casing 17. Preferably, the bearings 24 (see Fig. 3) are of the preloaded type so that radial and end play are reduced to a minimum, and a very rigid mounting is obtained. The bearings 24 are mounted in fixed position in a counterbore 28 in the outer end of a large guide sleeve or quill 29 which extends inwardly in concentric spaced relation to the spindle 21, and which is slidably disposed in a cylindrical bearing sleeve 30 integral with the casing 17 and opening at one end through the wall 23. The inner raceways of the bearings 24 are clamped in position between a peripheral flange 31 on the outer end of the spindle 21 and a lock nut 32. A flange ring 33 is threaded into the outer end of the guide sleeve 29 into abutment with the end face of the latter and a peripheral stop shoulder 34 on the flange 31, and serves to clamp the outer raceways of the bearings 24 in the counterbore 28. A spline pin 35 threaded through the bearing sleeve 30 into a longitudinal groove 36 in the guide sleeve 29 serves to hold the latter against rotation. It will be evident that the spindle 21 and the guide sleeve 29 are axially adjustable as a unit in the bearing sleeve 30 and the gear hub 25, and that the spindle is freely rotatable within the guide sleeve.

The inner spindle 22, which may be designated as a boring spindle, is in the form of a solid cylindrical shaft extending slidably through the spindle 21. Removable bushings 37 and 38 for the inner spindle 22 are tightly inserted respectively in counterbores 39 and 40 formed in opposite ends of the spindle 21. Preferably, wiper rings 41 of a suitable material, such as bullhide, are inserted in the counterbore 39 against the outer end of the bushing 37 to prevent the entrance of chips, dirt and other foreign matter. The wiper rings 41 are held in place by a retainer ring 42 which is confined in the outer end of the counterbore 39 by suitable keys 43 bolted to the end face of the flange 31.

The inner end of the spindle 22 extends from the spindle 21 into an elongated tapered auxiliary casing 44 (see Figs. 1 and 2) attached at one end to the casing 17, and forming a unitary structure therewith. The free end of the casing 44 is closed by a removable cap 45. Slidably mounted in a series of axially aligned bearings 46, 47 and 48 within the casing 44 is a cylindrical feed ram 49. A pin 50 is threaded through the casing 44 into a longitudinal groove 51 in the exterior of the ram 49 to secure the latter against rotation. The spindle 22 extends rotatably through the ram 49, and at its extreme end is suitably journaled in anti-friction bearings 52 mounted in the outer end of the ram. A bearing 53 on the inner end of the ram 49 provides an intermediate support for the spindle 22. A guard 54ª encloses the spindle 22 along the space between the spindle 21 and the bearing 46.

It will be understood that suitable tools or fixtures may be mounted on the operative ends of the spindles 21 and 22. For example, a tool, such as a large milling cutter (not shown), may be bolted or otherwise secured to the outer end face of the flange 31 in driving engagement with the keys 43. The outer end of the spindle 22 is formed with an axial tapered socket 54 adapted to receive the shank of a tool, such as a boring tool (not shown).

A suitable change-speed mechanism is enclosed in the casing 17 for driving the spindles 21 and 22. Preferably, this mechanism is substantially the same as disclosed in Gallimore Patent No. 1,858,491, issued May 17, 1932, and briefly described comprises a selective nine-speed gearing 55 (see Fig. 11), and two two-speed gearings 56 and 57 (see Fig. 2) connected in series therewith and terminating in a power outlet shaft 58. The gearing 55 may be connected to any desired source of power, and in the present instance is shown as connected through bevel gears 59 to a power inlet spline shaft 60 extending vertically through the casing 44. The gearing 55 has two shiftable clutch units 61 and 62 movable selectively into any one of nine different operative positions by means of a control device 63 (see Figs. 9 and 10) having an actuating lever 64. Likewise, the two-speed gearings 56 and 57 (see Fig. 2) have shiftable clutch units 65 and 66 adapted to be actuated selectively into any one of four different operative positions by means of a control device 67 similar to the device 63 and having an operating lever 68. It will be evident that the shaft 58 may be driven at any one of thirty-six different speeds upon the selective actuation of the levers 64 and 68.

The shaft 58 is connected through a reducing gear 69 to the gear 26 which serves to drive the spindles 21 and 22. In the present instance, a drive sleeve 70 (see Fig. 3), interposed in concentrically spaced relation between the spindle 21 and the guide sleeve 29, is keyed and bolted coaxially at one end to one side of the gear 26, and in its other end portion is provided with inwardly projecting keys 71 slidably engaging in longitudinal spline grooves 72 in the exterior of the spindle 21. Hence, the drive sleeve 70 will rotate the spindle 21 in any position of axial adjustment.

In the present instance, the inner spindle 22 is driven directly from the outer spindle 21, so that the two spindles although relatively axially adjustable are rotated as a unit. The driving connection comprises two sets of opposed spline keys 73 which project inwardly from the spindle 21 into two diametrically opposed longitudinal grooves 74 in the exterior of the spindle 22.

To provide means for adjusting or feeding the outer spindle 21 axially, the guide sleeve 29 is formed on one side with a longitudinal series of rack teeth 75 (see Figs. 2 and 7) in mesh with a drive pinion 76. The two opposite end teeth 75ª are yieldably urged apart into normal fixed position, and are adapted upon movement into engagement with the pinion 76 respectively at the extreme limit positions of the guide sleeve 29 to be moved out of normal position, thereby preventing any further drive in the same direction, while automatically maintaining the necessary meshing engagement to effect a drive in the reverse direction, as disclosed in an application by Keith F. Gallimore, Serial No. 591,739, filed February 8, 1932 (Patent No. 2,002,480).

The pinion 76 is fixed on the lower end of a vertical shaft 77 which is connected at its upper end through bevel gears 78 and 79 to a horizontal shaft 80. A gear 81 with clutch teeth 82 on one end is freely rotatable on the shaft 80, and meshes with a gear 83 on a parallel shaft 84. Splined for axial movement on the shaft 80 is a shiftable clutch element 85 having end face teeth 86 for engagement with the teeth 82 to secure the gear 75

81 for rotation with the shaft 80. Each of the shafts 77, 80 and 84 is suitably journaled in the casing 17. The shaft 84 is connected through bevel gears 86ª and 87 to a perpendicular shaft 88 (see Figs. 4, 8 and 15) journaled in the cover plate 18 of the casing 17, and adapted for manual actuation by means of any one of a plurality of quadrant levers 89. Secured to the forward end of the shaft 88 is an enlarged head or drum 90 in which the levers 89 are mounted for pivotal movement on axes extending perpendicularly to the shaft. Manual adjustment of the guide sleeve 29 and the spindle 21 therefore may be effected, when the clutch 82, 86 is closed, by actuating the levers 89 to rotate the drum 90.

To provide means for axially feeding or adjusting the inner spindle 22, the ram 49 is formed in one side with a longitudinal series of rack teeth 91 (see Figs. 1 and 6) in mesh with a drive pinion 92. The opposite end teeth 91ª are constructed similarly to the teeth 75ª so as to prevent movement of the ram 49 in either direction beyond its opposed limit positions with maintaining the necessary gear engagement for a reverse drive.

The pinion 92 is fixed on a vertical stub shaft 93 journaled in the casing 44, and connected through bevel gears 94 and 95 to a horizontal shaft 96 extending into the casing 17. Fixed on the inner end of the shaft 96 and rotatably supported in the casing 17 is a clutch element 97 having end face teeth 98. A second clutch element 99 (see Fig. 4) is splined for axial shifting movement on the adjacent end of an intermediate shaft 100, and has end face clutch teeth 101 adapted for engagement with the teeth 98 to establish the feed drive to the ram 49. The intermediate shaft 100 is journaled in the casing 17 between and in axial alignment with the shafts 84 and 96, and is connected through a bevel gear 102 with the gear 87. When the clutch 98, 101 is closed, the ram 49 may be fed or adjusted manually by rotating the drum 90.

Means is provided for closing the clutches 82, 86 and 98, 101 singly so that only one of the spindles 21 and 22 can be fed axially at a time. This means (see Fig. 4) preferably comprises a shifter rod 103 mounted in the casing 17 for axial adjustment in a direction parallel to the shafts 84 and 96. Two shifter shoes 104 and 105 fixed on opposite ends of the rod 103 engage respectively in peripheral grooves 106 and 107 formed in the clutch elements 85 and 99. A yoke 108, operable by a hand lever 109 on a rock shaft 110, engages a trunnion 111 on the shoe 105. Thus, movement of the rod 103 to the right will open the clutch 82, 86 and close the clutch 98, 101, and movement thereof in the reverse direction will open the clutch 98, 101 and close the clutch 82, 86.

Suitable clamps are provided for securing the spindles 21 and 22 in their respective positions of axial adjustment. The clamp for the spindle 21 (see Fig. 7) comprises two clamp blocks 115 disposed in a bore 116 in the casing 17 for engagement with opposite sides of the guide sleeve 29 at a point adjacent the wall 23, and having respectively right hand and left hand threaded engagement with an actuating screw 117. The forward end of the screw 117 is axially splined in a sleeve 118 rotatably confined in the outer end of the bore 116, and adapted for actuation from the front of the casing 17.

The clamp for the inner spindle 22 (see Fig. 6) comprises a vertical shaft 119 journaled in the rear side of the taper casing 44 preferably in the transverse plane of the shaft 93. Two arcuately faced clamp shoes 120 have respectively a right hand and a left hand threaded connection with the shaft 119, and are positioned to engage the outer periphery of the ram 49. A forwardly extending operating handle 121 is secured to the upper end of the shaft 119.

Power means available at will is also provided for axially feeding the spindles 21 and 22 selectively in timed relation to the rotation. This means (see Figs. 8, 14, and 15) comprises a speed-change drive from the shaft 58 through a master clutch 122 to the shaft 88. The specific drive herein shown is substantially the same as disclosed in the aforesaid patent, and comprises a nine-speed gearing 123 having an inlet gear 124 in mesh with a gear 125 on the shaft 58. The gearing 123 has four shiftable clutch units 126, 127, 128 and 129 movable selectively into any one of nine different operative positions, and adapted to be adjusted by a control device 130 having an operating handle 131 at the front of the casing 17. A two-speed gearing 132 and a reverse gearing 133 are connected in series with the gearing 123, and are provided respectively with shiftable clutch units 134 and 135 having independent operating handles 136 and 137. All of the gearings 123, 132 and 133 preferably are mounted on the inside of the cover plate 18 of the casing 17. The composite adjustment of the gearings 123 and 132, in terms of axial feed in inches per revolution for both spindles 21 and 22, is indicated at all times by an indicating device 138 (see Figs. 12 and 13). The reverse gearing 133 has an outlet gear 139 meshing with a gear 140 on a shaft 141. The latter is connected through a worm 142 and worm wheel 143 to one element 144 of the master clutch 122. Preferably, the clutch element 144 is rotable on the shaft 88 and has a series of concentrically arranged internal teeth or serrations 145. Mounted for radial movement in the drum 90 are a plurality of clutch jaws 146 normally spring-pressed inwardly, and adapted to be projected outwardly into engagement with the teeth 145 by a cam plunger 147 extending axially into the outer end of the shaft 88. The quadrant levers 89 carry gear segments 148 in mesh with peripheral rack teeth 149 on the plunger 147 whereby the latter may be adjusted to open and close the clutch 122.

To provide means for automatically opening the clutch 122 after a predetermined feed, one lever 89 is formed with a rearwardly extending cam arm 150 adapted for engagement by a limit stop 151 mounted for adjustment into different positions about the block 90.

A shaft 152 journaled in the cover plate 18, is connected at one end to the worm 142, and is provided at the other end with a hand wheel 153 and an adjustable micrometer 154, whereby the spindles 21 and 22 may be fed manually.

In operation, both spindles 21 and 22 may be rotated as a unit at any one of thirty-six different speeds depending on the selective adjustment of the levers 64 and 68. Either spindle may be utilized depending on the character of the machining operation to be performed. When the inner spindle 21 is to be used, a tool such for example as a boring tool is mounted in the socket 54, and the lever 109 is actuated to close the clutch 98, 101. Thereupon, the clutch 82, 86 is opened so that the axial drive is disconnected from the outer spindle. Conversely, when the outer spindle is to be used, a tool such for example as a milling cutter is secured to the end flange 31, and the lever 109 is actuated to close the clutch 82, 86, thereby opening the clutch 98, 101 to disconnect the axial feed from the inner spindle. The rate of feed in each instance relative to the speed of rotation in revolutions per minute is subject to adjustment by means of the levers 131 and 136. The feed or adjustment may be effected manually upon opening the clutch 122, either by revolving the levers 89 or turning the wheel 153, and may be driven by power upon closing the clutch 122.

By providing an axial feed for the outer spindle 21, the range of usefulness of the headstock is substantially increased. Certain kinds of operations, for example heavy milling or facing on stepped surfaces, cannot be performed satisfactorily or advantageously by the inner spindle 22 due to sidewise flexure of the latter when adjusted into extended position. Such milling operations can be performed successfully by the outer spindle 21 which is rigid and sturdy, and which can be fed axially to any desired depth.

While the invention is not limited to any particular type of machine, it is especially suited for horizontal boring, drilling and milling machines of the floor type and planer type. The selective axial adjustment of the two concentric spindles makes possible the efficient performance of various boring, facing, turning and milling operations, and is of particular advantage in facing and turning by means of a tool head mounted on the outer spindle.

We claim as our invention:

1. A headstock comprising, in combination, a hollow casing, an outer horizontal tool spindle slidably and rotatably mounted in said casing and extending therefrom, an inner horizontal tool spindle extending concentrically through said outer spindle for independent axial feeding movement, drive means including speed change gearing mounted in said casing for rotating said spindles at any one of a plurality of speeds, means for independently adjusting either of said spindles axially in either direction regardless of the axial position of the other spindle, and power drive means available at will for actuating said last mentioned means, whereby said outer spindle may be projected horizontally from said casing to provide a rigid extended support for said inner spindle when the latter is projected horizontally a substantial distance from said casing.

2. A headstock comprising, in combination, a hollow casing, an outer spindle slidably and rotatably mounted in said casing and extending therefrom, an inner tool spindle extending concentrically through said outer spindle for rotation therewith and for independent axial movement, power drive means including speed change gearing mounted in said casing for rotating said spindles at any one of a plurality of speeds, means for adjusting either of said spindles axially, and means operable by said drive means and including speed-change gearing for actuating said last mentioned means at any one of a plurality of speeds in relation to the rotation of said spindles.

3. A spindle headstock comprising, in combination, a casing, two concentric tool spindles mounted in said casing for rotation and for axial movement, a shaft parallel to said spindles and journaled in said casing, change speed means in said casing for driving said shaft at any one of a plurality of speeds, means driven by said shaft for rotating said spindles in any position of axial adjustment, and change speed means driven from said shaft for adjusting said spindles axially at any one of a plurality of speeds for a given speed of rotation.

4. A spindle headstock comprising, in combination, a casing formed with a bearing sleeve opening to one end thereof, a guide sleeve non-rotatably mounted in said bearing sleeve for axial adjustment, a gear journaled in said casing, an outer sleeve tool spindle extending through and journaled in said guide sleeve for axial movement therewith and extending slidably through said gear, an inner tool spindle extending slidably through said outer spindle and keyed thereto for rotation therewith, a drive sleeve extending concentrically between said guide sleeve and said outer spindle, said drive sleeve being rotatable with said gear and being axially splined to said outer spindle, means for rotating said gear, and means for adjusting said spindles axially.

5. A spindle headstock comprising, in combination, a hollow headstock casing provided internally with a bearing sleeve opening to one end thereof, a guide sleeve mounted in said bearing sleeve for axial adjustment, an outer sleeve tool spindle extending through and journaled in said guide sleeve for axial movement therewith, an inner tool spindle extending slidably through said first mentioned spindle, means for rotating said spindles, and means for adjusting said outer spindle axially.

6. A spindle headstock comprising, in combination, a casing having a bearing sleeve, a non-rotatable guide sleeve mounted in said bearing sleeve for axial adjustment, a gear journaled in said casing in axial alignment with said guide sleeve, a tool spindle extending through said guide sleeve and journaled therein for axial movement therewith, one end of said spindle extending slidably through said gear, a drive sleeve rigid with said gear and splined for relative axial adjustment with said spindle, means for driving said gear, and means for feeding said spindle axially.

7. A spindle headstock comprising, in combination, a casing having a bearing sleeve, a guide sleeve mounted in said bearing sleeve for axial adjustment, a tubular tool spindle extending through said guide sleeve and journaled at its operative end therein for axial movement therewith, means for rotating said spindle, means operable manually or by power and coacting with said guide sleeve for adjusting said spindle axially to project said spindle and said guide sleeve from said casing, and means for clamping said guide sleeve in position of adjustment.

8. A spindle headstock comprising, in combination, a casing having a bearing sleeve, a non-rotatable guide sleeve mounted in said bearing sleeve for axial adjustment, a gear journaled in said casing in axial alignment with said guide sleeve, a tool spindle extending through said guide sleeve and journaled therein for axial movement therewith, one end of said spindle extending slidably through said gear, a drive sleeve rigid with said gear and splined for relative axial adjustment with said spindle, rack teeth in one side of said guide sleeve, a pinion meshing with said rack teeth, the end rack teeth being spring seated to limit the axial movement of said guide sleeve in each direction while maintaining a driving engagement with said pinion for movement in the opposite direction, means for driving said gear, and means including a clutch for driving said pinion.

9. A spindle headstock comprising, in combination, a casing having a bearing, a guide sleeve mounted in said bearing for axial adjustment, a tool spindle extending through said guide sleeve and journaled therein for axial movement therewith, a gear having an axial spline connection with said spindle, rack teeth on said guide sleeve, a pinion meshing with said rack teeth, means for driving said gear, means including a clutch for driving said pinion, and a tool spindle extending through said first mentioned spindle.

10. A spindle headstock comprising, in combination, a main casing, an auxiliary casing secured to one end of said main casing, a guide sleeve mounted for axial adjustment in the other end of said main casing, a ram in axial alignment with said guide sleeve, and mounted for axial adjustment in said auxiliary casing, a tubular tool spindle extending through and journaled at one end in the outer end of said guide sleeve for axial movement therewith, an inner tool spindle extending through said tubular spindle and into said ram and journaled in the latter for axial movement therewith, means for rotating said spindles, two rack and pinion means associated respectively with said guide sleeve and said ram for adjusting them axially, power drive means, two clutches for connecting said power drive means respectively to said rack and pinion means, and interlock means for selectively closing one or the other of said clutches.

11. A spindle headstock comprising, in combination, a casing having two axially spaced bearings, a guide sleeve mounted for axial adjustment in one bearing, a ram in axial alignment with said guide sleeve and mounted for axial adjustment in the other bearing, a tubular tool spindle extending through and journaled in said guide sleeve for axial movement therewith, an inner tool spindle extending slidably through said tubular spindle and into said ram and journaled in the latter for axial movement therewith, means for rotating said spindles, and drive means associated with said guide sleeve and said ram for adjusting them axially.

12. A spindle headstock comprising, in combination, a casing having two axially spaced bearings, a guide sleeve mounted for axial adjustment in one bearing, a ram in axial alignment with said guide sleeve and mounted for axial adjustment in the other bearing, a tubular tool spindle extending through and journaled in said guide sleeve for axial movement therewith, an inner tool spindle extending slidably through said tubular spindle and into said ram and journaled in the latter for axial movement therewith, means for rotating said spindles, drive means adapted for manual actuation for selectively adjusting said guide sleeve and said ram axially, and power means available at will for actuating said drive means.

13. A spindle headstock comprising, in combination, a casing having an opening in one wall and a bearing in alignment with said opening, an elongated cylindrical sleeve mounted horizontally in said bearing for axial adjustment and adapted to be projected through said opening from said casing, means for holding said sleeve against rotation, a first tool spindle extending axially through and translatable with said sleeve, an antifriction bearing in the outer end of said sleeve for rotatably supporting said spindle, a second tool spindle extending through said first spindle for independent axial adjustment, means for rotating said spindles, means for adjusting said sleeve axially, means for adjusting said second spindle axially, drive means selectively operable either manually or by power for said last two mentioned adjusting means, and means for clamping said sleeve in position of adjustment.

14. A spindle headstock comprising, in combination, a casing having an opening in one wall and a bearing in alignment with said opening, an elongated guide member mounted in said bearing for longitudinal adjustment and having one end adapted to be projected through said opening from said casing, means for adjusting said guide member longitudinally, means for clamping said guide member in position of adjustment, a first tool spindle extending longitudinally through and journaled in said guide member for translation therewith, a second tool spindle extending through said first spindle for independent axial adjustment, means for adjusting said second spindle axially, and means for rotating said spindles.

15. A spindle headstock comprising, in combination, a casing having an opening in one wall, a first tubular tool spindle mounted in said casing for rotation and axial adjustment and having one end adapted to be projected through said opening a substantial distance from said casing, means for adjusting said spindle axially through a predetermined maximum range, a second tool spindle extending concentrically through said first tool spindle and being mounted for rotation and independent axial adjustment in normal cutting operation of the machine, said second spindle having an operative end adapted to be projected axially a substantial distance from said first spindle regardless of the axial position of the latter, means for adjusting said second spindle axially through a predetermined range greater in extent than said first mentioned range, and drive means for rotating said spindles.

16. A spindle headstock comprising, in combination, a casing having an opening in one wall and a bearing in alignment with said opening, an elongated cylindrical sleeve mounted in said bearing for axial adjustment and adapted to be projected through said opening from said casing, means for holding said sleeve against rotation, a first tool spindle extending axially through and translatable with said sleeve, a second tool spindle extending through said first spindle for independent axial adjustment, means for rotating said spindles, means for adjusting said sleeve axially, means for adjusting said second spindle axially, drive means selectively operable either manually or by power for said last two mentioned adjusting means, and means for clamping said sleeve in position of adjustment.

17. A spindle headstock comprising, in combination, a hollow headstock casing having an opening in one wall and a bearing in alignment with said opening, an elongated guide member mounted in said bearing for longitudinal adjustment and having one end adapted to be projected through said opening from said casing, power and manual means selectively available for adjusting said guide member longitudinally in a cutting traverse or a set-up adjustment, means for clamping said guide member in position of adjustment, a first tool spindle extending longitudinally through and journaled in said guide member for translation therewith, a second tool spindle extending through said first tool spindle for independent axial adjustment, power and manual means selectively available for adjusting said second spindle axially in a cutting traverse or a set-up adjustment independently of said first spindle, and means for rotating said spindles.

18. A spindle headstock comprising, in combination, a hollow headstock casing having an opening in one wall and a bearing in alignment with said opening, an elongated guide member mounted in said bearing for longitudinal adjustment and having one end adapted to be projected through said opening from said casing, power and manual means selectively available for adjusting said guide member longitudinally in a cutting traverse or a set-up adjustment, means for clamping said guide member in position of adjustment, a first tool spindle extending longitudinally through and journaled in said guide member for translation therewith, a second tool spindle extending through said first tool spindle for independent axial adjustment, power and manual means selectively available for adjusting said second spindle axially in a cutting traverse or a set-up adjustment independently of said first spindle, clamp means available at will for securing said tool spindle against axial adjustment, and means for rotating said spindles.

19. A spindle headstock comprising, in combination, a casing having two axially spaced bearings, a guide sleeve mounted for axial adjustment in one bearing, a ram in axial alignment with said guide sleeve and mounted for axial adjustment in the other bearing, a tool spindle extending slidably through and mounted for rotation in said guide sleeve and extending into said ram and journaled in the latter for axial movement therewith, means for rotating said spindle, and drive means associated with said guide sleeve and said ram for independently adjusting said sleeve and ram axially.

20. A spindle headstock comprising, in combination, a casing having an opening in one wall, an elongated tubular sleeve member mounted in said casing for axial adjustment and having one end adapted to be projected through said opening a substantial distance from said casing, means for adjusting said sleeve member axially through a predetermined maximum range, a tool spindle extending concentrically through said sleeve member and being mounted for rotation therein and for independent axial adjustment in normal cutting operation of the machine, said spindle having an operative end adapted to be projected axially a substantial distance from said sleeve member regardless of the axial position of the latter, means for adjusting said spindle axially through a predetermined range greater in extent than said first mentioned range, and drive means for rotating said spindle.

21. A spindle headstock comprising, in combination, a hollow headstock casing having an opening in one wall and a bearing in alignment with said opening, an elongated guide member mounted in said bearing for longitudinal adjustment and having one end adapted to be projected through said opening from said casing, power and manual means selectively available for adjusting said guide member longitudinally in a set-up adjustment, means for clamping said guide member in position of adjustment, a tool spindle extending through said guide member and mounted for rotation in said guide member and for independent axial adjustment, power and manual means selectively available for adjusting said spindle axially in a cutting traverse or a set-up adjustment independently of said guide member, and means for rotating said spindle.

HANS B. KRAUT.
KEITH F. GALLIMORE.